US012811225B2

(12) United States Patent
Roh

(10) Patent No.: US 12,811,225 B2
(45) Date of Patent: Nov. 24, 2026

(54) POUCH-SHAPED BATTERY CELL WITH IMPROVED SAFETY AND BATTERY MODULE INCLUDING THE SAME

(71) Applicant: LG Energy Solution, Ltd., Seoul (KR)

(72) Inventor: Tae Hwan Roh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 539 days.

(21) Appl. No.: 18/271,109

(22) PCT Filed: Dec. 21, 2022

(86) PCT No.: PCT/KR2022/021012
§ 371 (c)(1),
(2) Date: Jul. 6, 2023

(87) PCT Pub. No.: WO2023/136496
PCT Pub. Date: Jul. 20, 2023

(65) Prior Publication Data

US 2025/0055097 A1 Feb. 13, 2025

(30) Foreign Application Priority Data

Jan. 11, 2022 (KR) ........................ 10-2022-0004314

(51) Int. Cl.
*H01M 50/186* (2021.01)
*H01M 10/613* (2014.01)
(Continued)

(52) U.S. Cl.
CPC ....... *H01M 50/186* (2021.01); *H01M 10/613* (2015.04); *H01M 10/647* (2015.04);
(Continued)

(58) Field of Classification Search
CPC ............. H01M 50/186; H01M 10/613; H01M 10/647; H01M 10/653; H01M 50/105;
(Continued)

(56) References Cited

U.S. PATENT DOCUMENTS

2006/0286450 A1 12/2006 Yoon et al.
2007/0207377 A1 9/2007 Han et al.
(Continued)

FOREIGN PATENT DOCUMENTS

CN 107636887 A 1/2018
CN 107949932 A 4/2018
(Continued)

OTHER PUBLICATIONS

Extended European Search Report including Written Opinion for Application No. 2905484.6 dated Aug. 5, 2025. 9 pages.
(Continued)

*Primary Examiner* — Stewart A Fraser
(74) *Attorney, Agent, or Firm* — Lerner David LLP

(57) ABSTRACT

The present invention relates to a pouch-shaped battery cell with improved safety and a battery module including the same, and more particularly to a pouch-shaped battery cell including a first cell case and a second cell case, each of which is made of a laminate sheet including an inner coating layer, a metal layer, and an outer coating layer, an edge of each of the first cell case and the second cell case being sealed by thermal fusion, an electrode assembly received in the first cell case and the second cell case, a positive electrode lead and a negative electrode lead, each of which has one side connected to the electrode assembly and the other side protruding outwards from the first cell case and the second cell case, and a pressing member configured to wrap a sealed portion formed by thermal fusion and a battery module including the same.

9 Claims, 6 Drawing Sheets

(51) Int. Cl.

| | |
|---|---|
| ***H01M 10/647*** | (2014.01) |
| ***H01M 10/653*** | (2014.01) |
| ***H01M 50/105*** | (2021.01) |
| ***H01M 50/184*** | (2021.01) |
| ***H01M 50/197*** | (2021.01) |
| ***H01M 50/211*** | (2021.01) |
| ***H01M 50/507*** | (2021.01) |

(52) U.S. Cl.
CPC ....... *H01M 10/653* (2015.04); *H01M 50/105* (2021.01); *H01M 50/184* (2021.01); *H01M 50/197* (2021.01); *H01M 50/211* (2021.01); *H01M 50/507* (2021.01)

(58) Field of Classification Search
CPC ............. H01M 50/184; H01M 50/197; H01M 50/211; H01M 50/507; H01M 50/514; H01M 50/129
See application file for complete search history.

(56) References Cited

U.S. PATENT DOCUMENTS

| | | | | |
|---|---|---|---|---|
| 2011/0318623 | A1 | 12/2011 | Lee et al. | |
| 2012/0094166 | A1* | 4/2012 | Lee .................... | H01M 10/647 429/120 |
| 2012/0156537 | A1 | 6/2012 | Meintschel et al. | |
| 2018/0138472 | A1 | 5/2018 | Choi | |
| 2018/0241023 | A1 | 8/2018 | Lim et al. | |
| 2020/0235360 | A1 | 7/2020 | Lim et al. | |
| 2020/0343604 | A1* | 10/2020 | Lee .................... | H01M 50/553 |
| 2020/0411815 | A1 | 12/2020 | Shin et al. | |
| 2022/0166084 | A1 | 5/2022 | Park et al. | |

FOREIGN PATENT DOCUMENTS

| | | | |
|---|---|---|---|
| CN | 113795971 | A | 12/2021 |
| EP | 3920313 | A1 | 12/2021 |
| JP | 2000011969 | A | 1/2000 |
| JP | 2021118158 | A | 8/2021 |
| KR | 20070025391 | A | 3/2007 |
| KR | 100880386 | B1 | 1/2009 |
| KR | 20100047907 | A | 5/2010 |
| KR | 20120006973 | A | 1/2012 |
| KR | 20120069319 | A | 6/2012 |
| KR | 20140141825 | A | 12/2014 |
| KR | 20160106932 | A | 9/2016 |
| KR | 20190087746 | A | 7/2019 |
| KR | 20210009914 | A | 1/2021 |
| KR | 20210020413 | A | 2/2021 |
| KR | 20210064934 | A | 6/2021 |
| KR | 20210088172 | A | 7/2021 |
| KR | 20210145557 | A | 12/2021 |
| WO | 2011-125505 | A1 | 10/2011 |

OTHER PUBLICATIONS

International Search Report for PCT/KR2022/021012 mailed Mar. 24, 2023. 4 pgs. (see p. 2, categorizing the cited references).
Search Report dated Oct. 16, 2026 from the Office Action for Chinese Application No. 202280008876.3, dated Oct. 17, 2026. 3 pages.

* cited by examiner

【FIG. 1】
-- Prior Art --
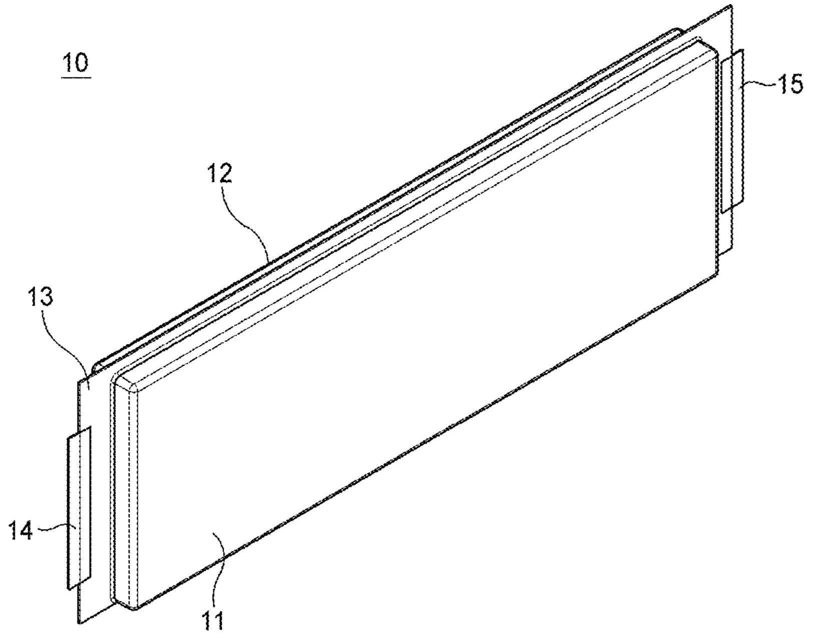
【FIG. 2】
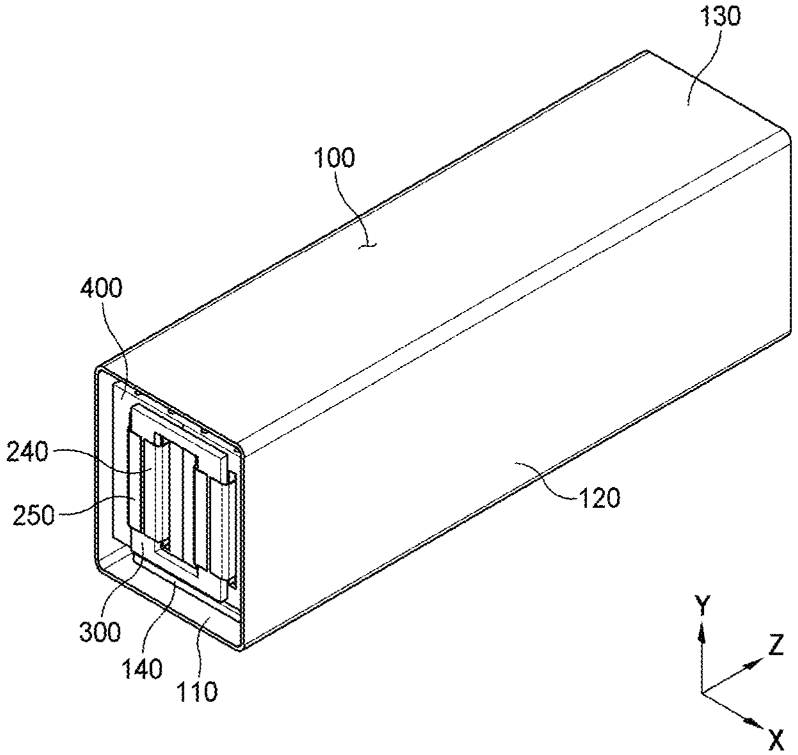

【FIG. 3】
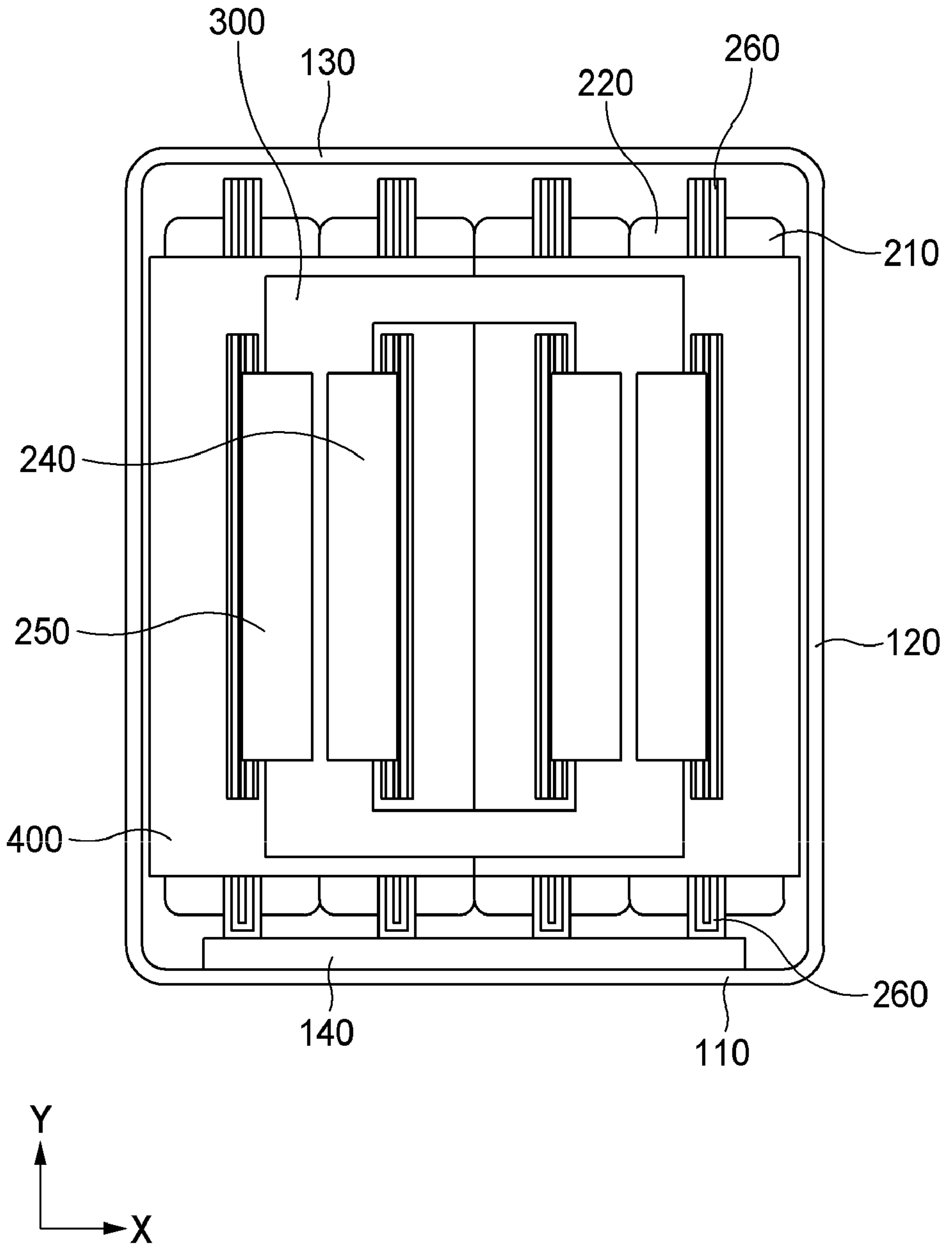

【FIG. 4】
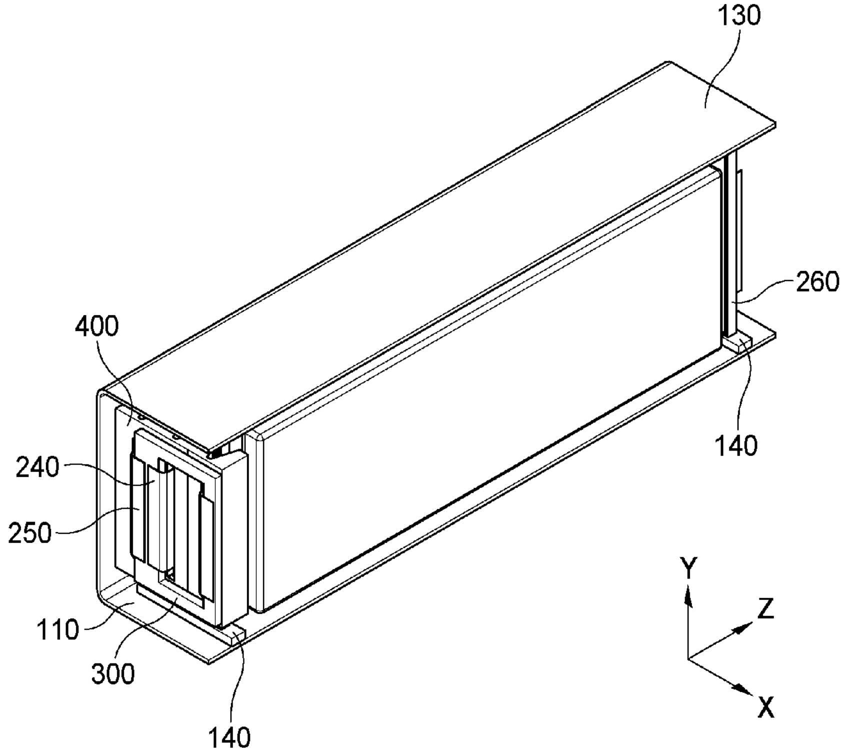
【FIG. 5】
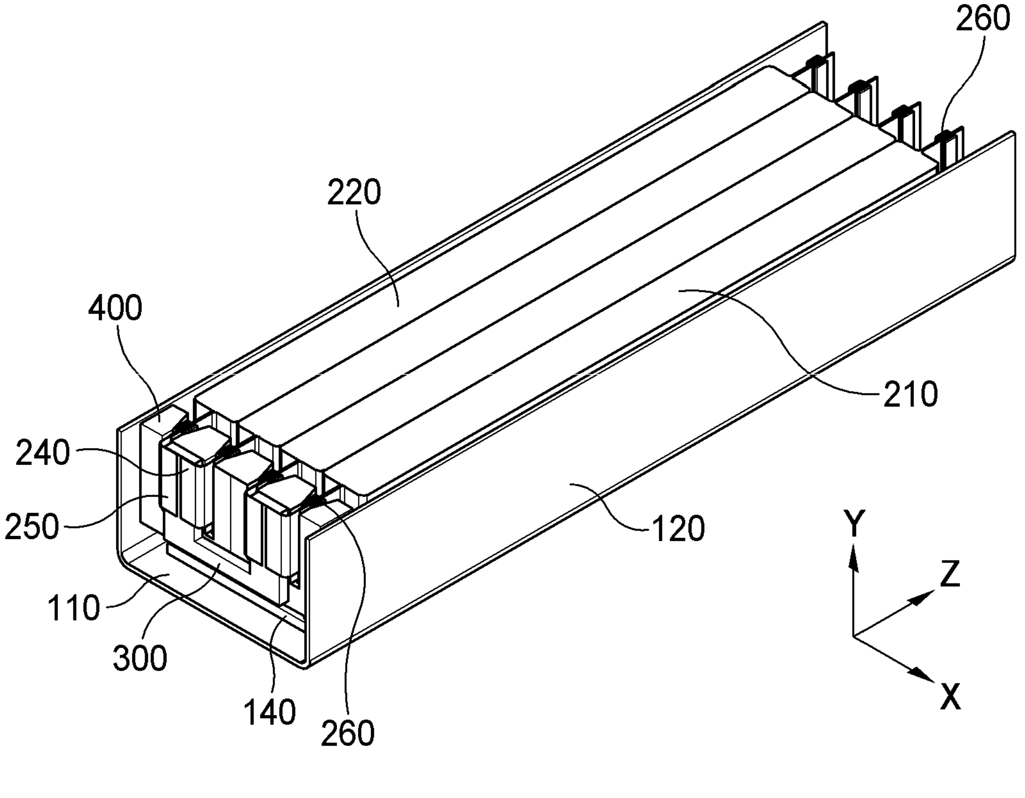

【FIG. 6】
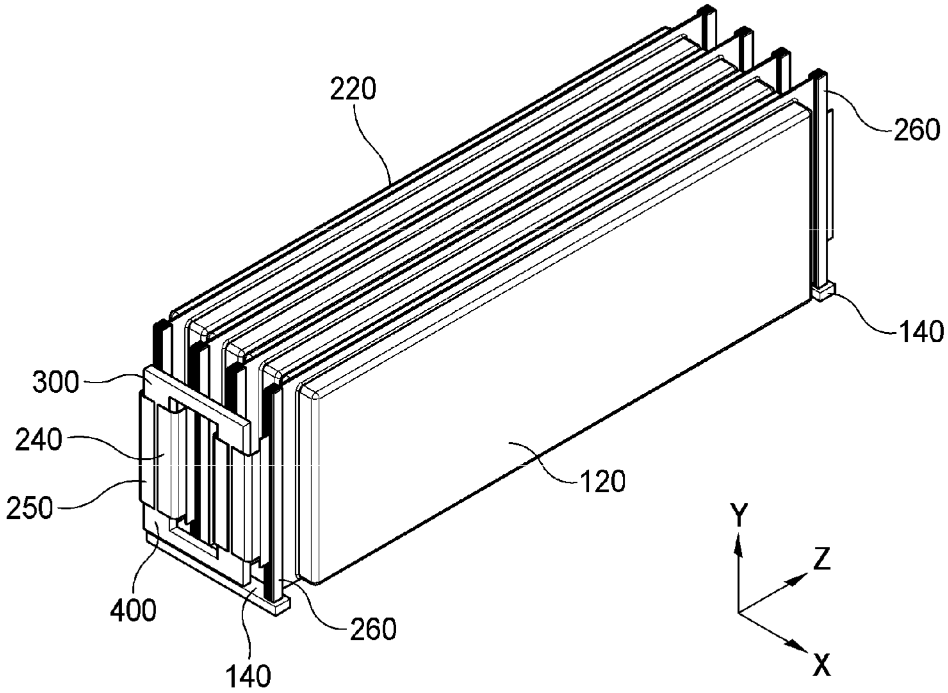
【FIG. 7】
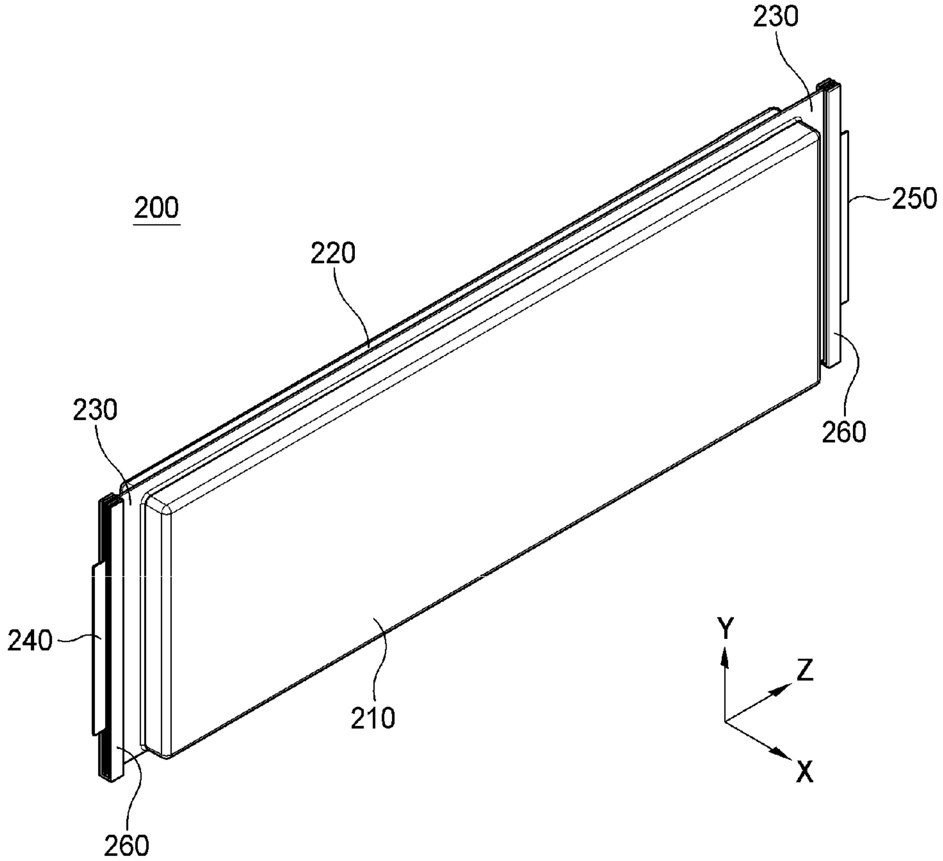

【FIG. 8】
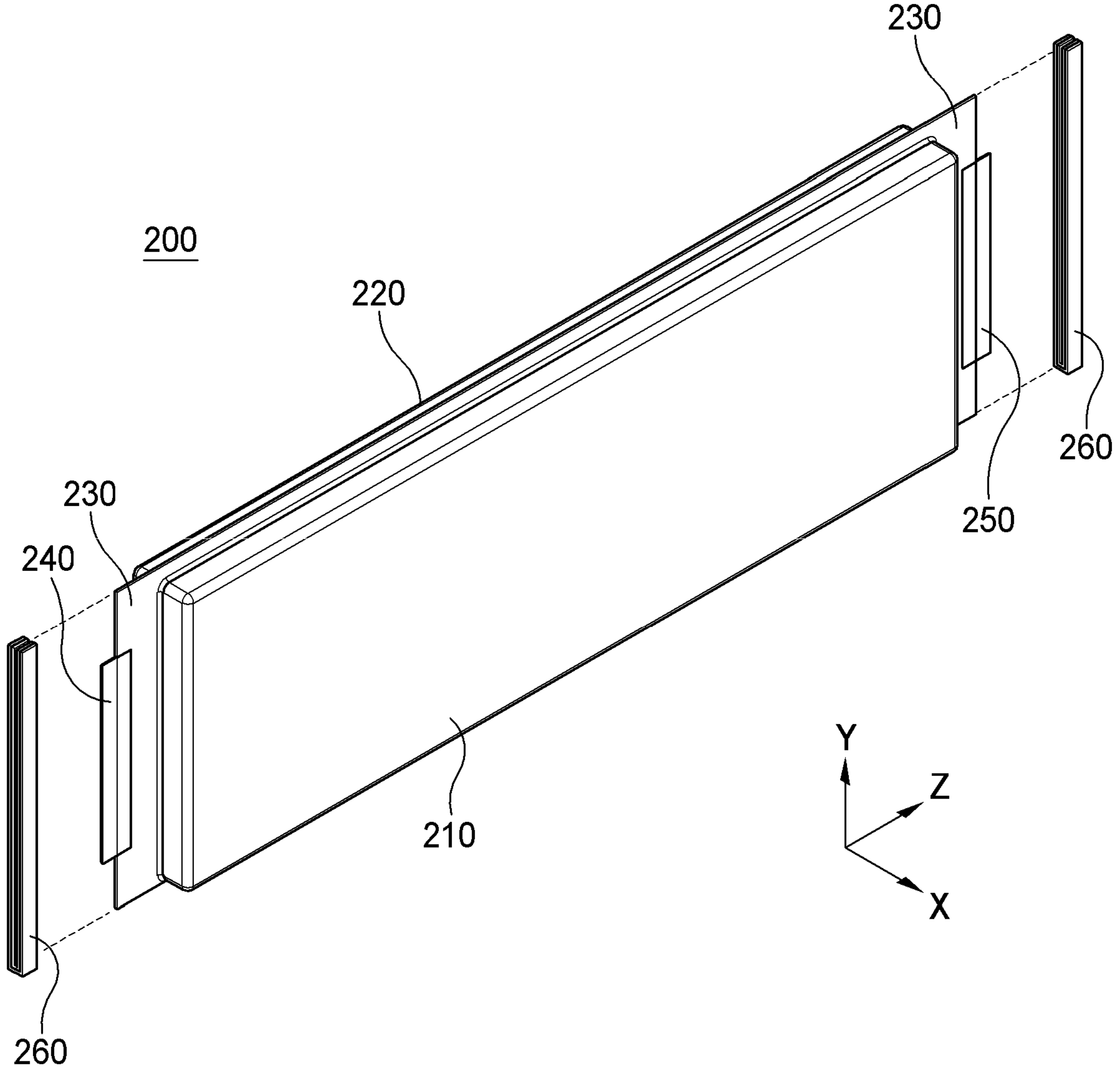

【FIG. 9】
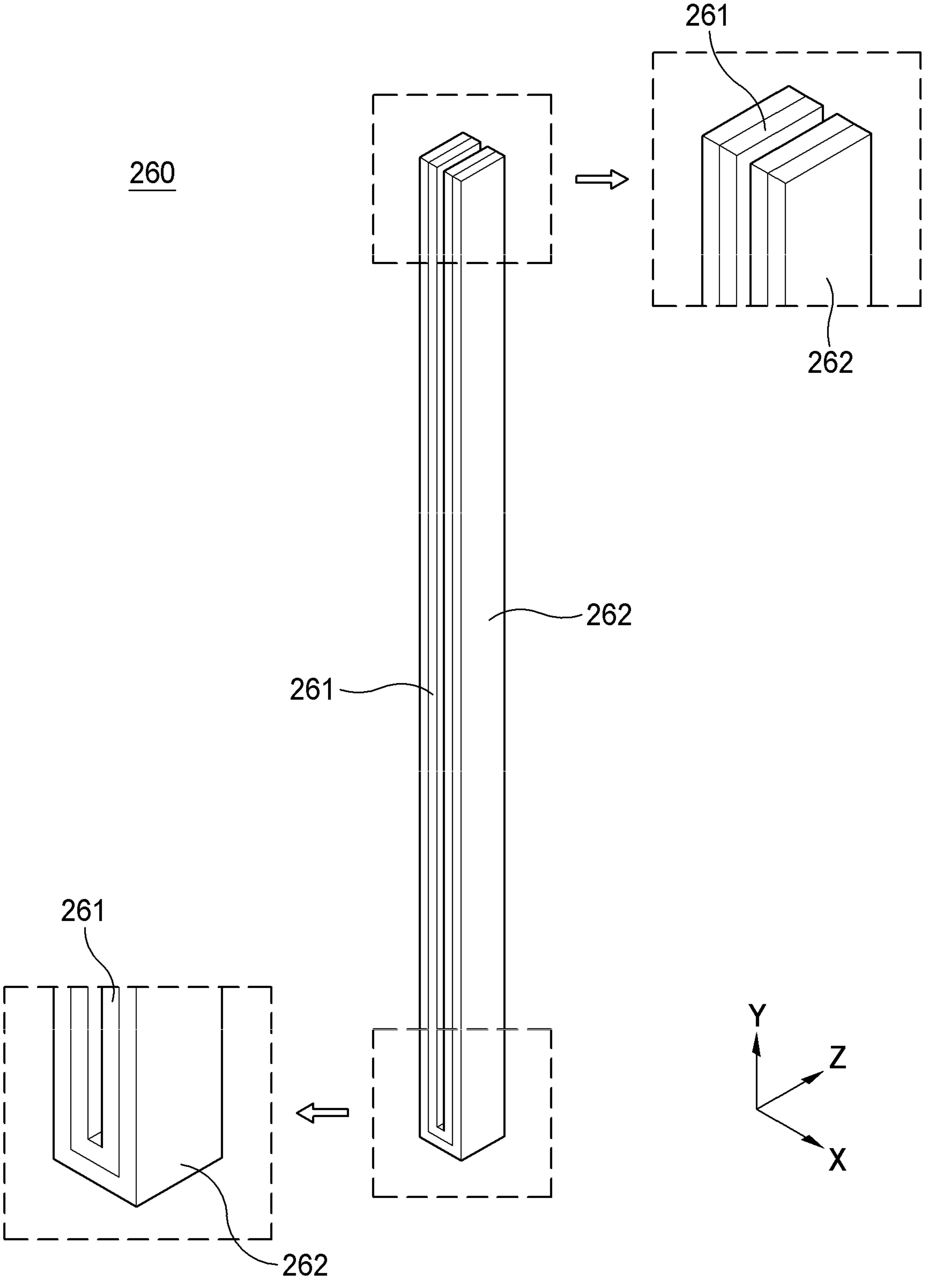

POUCH-SHAPED BATTERY CELL WITH IMPROVED SAFETY AND BATTERY MODULE INCLUDING THE SAME

CROSS-REFERENCE TO RELATED APPLICATIONS

This application is a national stage entry under 35 U.S.C. § 371 of International Application No. PCT/KR2022/021012, filed on Dec. 21, 2022, which claims priority to Korean Patent Application No. 10-2022-0004314, filed on Jan. 11, 2022, the disclosures of which are hereby incorporated herein by reference in their entireties.

TECHNICAL FIELD

The present invention relates to a pouch-shaped battery cell with improved safety and charging and discharging output performance and a battery module including the same, and more particularly to a pouch-shaped battery cell with improved safety configured such that a pressing member is provided at a sealed portion of the battery cell and a heat transfer pad is provided at a battery module case, whereby the battery cell has a structure capable of preventing or delaying gas venting and rapid heat dissipation, and a battery module including the same.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel cadmium battery, a nickel hydride battery, and a nickel zinc battery as secondary batteries that are widely used at present. In general, a plurality of unit secondary battery cells may be connected to each other in series or in parallel to constitute a battery module depending on required output voltage or charge and discharge capacities.

In particular, usage of a pouch-shaped lithium ion battery having a structure in which a stacked type or stacked and folded type electrode assembly is mounted in a pouch-shaped battery case made of an aluminum laminate sheet has gradually increased due to advantages of low manufacturing cost and high energy density.

FIG. 1 is a conceptual view of a conventional pouch-shaped battery cell. In the conventional pouch-shaped battery cell, an electrode assembly is received in a receiving space formed by a first cell case 11 and a second cell case 12. Electrode tabs extending from the electrode assembly are located SO as to be exposed outwards from the cell case in a state of being electrically connected to a positive electrode lead 14 and a negative electrode lead 15, respectively.

At this time, edges of the first cell case 11 and a second cell case 12, which overlap each other, are sealed by thermal fusion, and therefore the electrode assembly is blocked from contact with the outside.

When the temperature of the battery cell increases during repeated charging and discharging or as the result of the occurrence of an event, performance of adhesion at the sealed portion formed by thermal fusion is deteriorated. In particular, the temperature near the electrode leads connected to the electrode tabs increases to the highest, and therefore the parts of the sealed portion at which the electrode leads are located are weakest. In consideration of the recent development trend of electric vehicles, there is a need to develop a battery cell that can be stably used even at high current, such as rapid charging.

PRIOR ART DOCUMENT (Patent Document 1) Korean Patent Application Publication No. 2016-0106932

DISCLOSURE

Technical Problem

The present invention has been made in view of the above problems, and it is an object of the present invention to provide a pouch-shaped battery cell with improved safety capable of increasing adhesive strength of a sealed portion and a battery module including the same.

It is another object of the present invention to provide a pouch-shaped battery cell with improved charging and discharging output performance capable of using high charging and discharging current in proportion to rapid dissipation of heat generated from the battery cell, whereby vehicle charging time is shortened and furthermore use of higher output is possible, and a battery module including the same.

Technical Solution

A pouch-shaped battery cell according to the present invention to accomplish the above objects includes a first cell case (210) and a second cell case (220), each of which is made of a laminate sheet comprising an inner coating layer, a metal layer, and an outer coating layer, an edge of each of the first cell case and the second cell case being sealed by thermal fusion, an electrode assembly received in the first cell case (210) and the second cell case (220); a positive electrode lead (240) and a negative electrode lead (250), each of which has one side connected to the electrode assembly and the other side disposed so as to protrude outwards from the first cell case (210) and the second cell case (220); and a pressing member (260) configured to wrap a sealed portion formed by thermal fusion.

Also, in the pouch-shaped battery cell according to the present invention, the pressing member (260) may be disposed so as to wrap the sealed portion at which the positive electrode lead (240) or the negative electrode lead (250) is located.

Also, in the pouch-shaped battery cell according to the present invention, the pressing member (260) may be formed in the shape in which a hexahedral bar having a predetermined thickness and width are folded.

Also, in the pouch-shaped battery cell according to the present invention, the pressing member (260) may include an inner layer (261) disposed in tight contact with an outer surface of the sealed portion and an outer layer (262) located outside the inner layer (261).

Also, in the pouch-shaped battery cell according to the present invention, the inner layer (261) may be made of a resin capable of transferring heat, and the outer layer (262) may be made of a metal material.

In addition, the present invention provides a battery module including a module case (100) including a bottom plate (110), a pair of side plates (120), and a top plate (130); a plurality of battery cells (200) received in the module case (100); and a plurality of busbars (300) configured to connect the plurality of battery cells (200) to each other in series or in parallel, wherein each of the battery cells (200) is the pouch-shaped battery cell.

Also, in the battery module according to the present invention, a heat transfer pad (140) may be further provided at an inner surface of the bottom plate (110).

Also, in the battery module according to the present invention, one end of a pressing member (260) of each of the battery cells (200) may be located in tight contact with the heat transfer pad (140).

Also, in the battery module according to the present invention, the bottom plate (110) may be made of a metal material.

In addition, the present invention provides a battery pack including the battery module.

Advantageous Effects

A pouch-shaped battery cell with improved safety according to the present invention has an advantage in that a pressing member configured to wrap a sealed portion at which an electrode lead is located is provided, whereby it is possible to prevent or delay gas venting, and therefore it is possible to improve safety of the battery cell and at the same time to increase lifespan of the battery cell.

In addition, a battery module with improved safety according to the present invention has a merit in that a battery cell having a pressing member made of a thermally conductive material is disposed in contact with a heat transfer pad provided in a module case made of a metal material, whereby rapid heat dissipation is possible.

DESCRIPTION OF DRAWINGS

FIG. 1 is a conceptual view of a conventional pouch-shaped battery cell.

FIG. 2 is a perspective view of a battery module according to a preferred embodiment of the present invention.

FIG. 3 is a front view of the battery module shown in FIG. 2.

FIG. 4 is a vertical sectional perspective view of the battery module shown in FIG. 2.

FIG. 5 is a horizontal sectional perspective view of the battery module shown in FIG. 2.

FIG. 6 is an internal perspective view of the battery module shown in FIG. 2.

FIG. 7 is a perspective view of a battery cell according to a preferred embodiment of the present invention.

FIG. 8 is an exploded perspective view of the battery cell shown in FIG. 7.

FIG. 9 is an enlarged perspective view of a pressing member mounted to the battery cell.

BEST MODE

In the present application, it should be understood that the terms “comprises,” “has,” “includes,” etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a pouch-shaped battery cell with improved safety according to the present invention and a battery module including the same will be described.

FIG. 2 is a perspective view of a battery module according to a preferred embodiment of the present invention, FIG. 3 is a front view of the battery module shown in FIG. 2, and FIG. 4 is a vertical sectional perspective view of the battery module shown in FIG. 2. In addition, FIG. 5 is a horizontal sectional perspective view of the battery module shown in FIG. 2, and FIG. 6 is an internal perspective view of the battery module shown in FIG. 2.

Referring to FIGS. 2 to 6, the battery module according to the present invention includes a module case 100, a plurality of battery cells 200, a plurality of busbars 300, and a busbar frame 400.

First, the module case 100, which is configured to receive the battery cells 200, the busbars 300, and the busbar frame 400 and to protect the battery cells, the busbars, and the busbar frame from external impact, may have an approximately hexahedral shape.

Specifically, the module case 100, which is made of a metal material, such as aluminum, may be constituted by a bottom plate 110 and a top plate 130 configured to support and protect lower parts and upper parts of the battery cells 200, respectively, a pair of side plates 120 configured to support side surfaces of the battery cells, and a heat transfer pad 140.

The bottom plate 110, the pair of side plates 120, and the top plate 130 may be integrally manufactured or may be separately manufactured and then fixed to each other using a known means, such as bolts. Although a front plate and a rear plate are not shown in the figures, the front plate and the rear plate may be further provided as needed.

The heat transfer pad 140 is disposed at an inner surface of the bottom plate 110, more specifically in a direction in which a positive electrode lead 240 and a negative electrode lead 250 of each of the battery cells 200 are located, and a lower end of a pressing member 260 of each of the battery cells 200 is disposed on an upper surface of the heat transfer pad 140 in tight contact therewith.

Consequently, heat generated from the battery cells 200 is transferred to the pressing members 260 and then sequentially passes through the heat transfer pad 140 and the bottom plate 110, which is made of a metal material, whereby it is possible to improve a heat dissipation effect of the battery module. In addition, the heat transfer pad 140 may support the load of the pressing members 260 and at the same time may contribute to reduction in tolerance that may occur at the time of assembly.

Here, although the material for the heat transfer pad 140 is not particularly restricted as long as the above-described functions can be performed, the heat transfer pad may be made of, for example, a known thermal interface material (TIM).

The heat transfer pad is shown as being located at each of a front end and a rear end of the bottom plate 110 in the figures. When each of the battery cells is a unidirectional battery cell having a positive electrode lead and a negative electrode lead exposed in the same direction, however, the heat transfer pad may be provided at only the positions at which the leads are disposed.

The battery cells 200 received in the module case 100, more specifically pouch-shaped battery cells, are erected vertically and stacked side by side.

FIG. 7 is a perspective view of a battery cell according to a preferred embodiment of the present invention, FIG. 8 is an exploded perspective view of the battery cell shown in FIG. 7, and FIG. 9 is an enlarged perspective view of a pressing member mounted to the battery cell.

As shown in FIGS. 7 to 9, the battery cell 200 according to the present invention includes a cell case, an electrode assembly (not shown) received in the cell case, a sealed portion 230 formed at an edge of the cell case, a pair of electrode tabs (not shown), a pair of electrode leads, each of which has one side electrically connected to a corresponding one of the electrode tabs and the other side protruding outward from the cell case, an insulation film (not shown), and a pressing member 260.

Specifically, the cell case is constituted by a first cell case 210 and a second cell case 220, each of which is made of a laminate sheet constituted by an outer coating layer, a metal layer, and an inner coating layer, and has a pocket-shaped space portion configured to receive the electrode assembly.

The inner coating layer is disposed in direct contact with the electrode assembly, and therefore the inner coating layer must exhibit high insulation properties and high resistance to an electrolytic solution. In addition, the inner coating layer must exhibit high sealability in order to hermetically seal the cell case from the outside, i.e. a thermally-bonded sealed portion between inner layers must exhibit excellent thermal bonding strength.

The inner coating layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability; however, the present invention is not limited thereto, and polypropylene, which exhibits excellent mechanical properties, such as tensile strength, rigidity, surface hardness, and impact resistance, and excellent chemical resistance, may be most preferably used.

The metal layer, which is disposed so as to abut the inner coating layer, corresponds to a barrier layer configured to prevent moisture or various kinds of gas from permeating into the battery from the outside. An aluminum thin film, which is lightweight and easily shapeable, may be used as a preferred material for the metal layer.

The outer coating layer is provided on the other surface of the metal layer. The outer coating layer may be made of a heat-resistant polymer that exhibits excellent tensile strength, resistance to moisture permeation, and resistance to air transmission such that the outer coating layer exhibits high heat resistance and chemical resistance while protecting the electrode assembly. As an example, the outer coating layer may be made of nylon or polyethylene terephthalate; however, the present invention is not limited thereto.

Meanwhile, the electrode assembly received in the first cell case 210 and the second cell case 220 may be classified as a stacked type electrode assembly, which is configured to have a structure in which a plurality of electrodes is stacked, a jelly-roll type electrode assembly, which is configured to have a structure in which a positive electrode and a negative electrode are wound in the state in which a separator is interposed therebetween,, a laminated and stacked type electrode assembly, which is configured to have a structure in which a plurality of unit cells is stacked, or a stacked and folded type electrode assembly, which is configured to have a structure in which unit cells are wound in a state of being located on a separator sheet.

A unit cell is manufactured to manufacture the laminated and stacked type electrode assembly or the stacked and folded type electrode assembly. The unit cell may be a mono-cell, which is configured to have a structure in which a separator is interposed between a positive electrode and a negative electrode, or a bi-cell, which is configured to have a structure in which a positive electrode, a negative electrode, and a positive electrode or a negative electrode, a positive electrode, and a negative electrode are stacked and a separator is interposed between the positive electrode and the negative electrode.

The electrode assembly according to the present invention may be configured to have a structure in which a negative electrode, a separator, a positive electrode, a separator, and a negative electrode are stacked, and the number of positive electrodes and negative electrodes constituting the electrode assembly may be freely set. In addition, the laminated and stacked type electrode assembly, in which a plurality of unit cells is laminated, may be used, and the structure of the electrode assembly may be applied to all electrode assemblies described in this specification.

The positive electrode and the negative electrode of the electrode assembly are provided with a positive electrode tab and a negative electrode tab, respectively, and the pair of tabs may be formed so as to protrude outwards from the cell case by a predetermined length in a state of being connected respectively to a positive electrode lead 240 and a negative electrode lead 250 by spot welding.

The insulation film is located at an upper surface and a lower surface of each of the pair of electrode leads, more specifically in the sealed portion 230 at which the first cell case 210 and the second cell case 220 are thermally fused to each other.

Consequently, it is possible to prevent electricity produced from the electrode assembly from flowing to the cell case via the electrode leads and to maintain the sealed state between each of the electrode leads and the cell case. Here, it is preferable for the insulation film to be made of a material that is hardly electrically conductive, i.e. a nonconductive material. In general, an insulation tape that is easily attached to the electrode lead and has a relatively small thickness may be mainly used; however, the present invention is not limited thereto.

Although the battery cell is shown as a bidirectional battery cell. in which the positive electrode lead 240 and the negative electrode lead 250 are located so as to face each other in the figures, a unidirectional battery cell in which the pair of electrode leads is disposed in the same direction may be used.

Next, the pressing member 260 will be described. The pressing member 260 is disposed so as to wrap the sealed portion 230 formed by thermal fusion, more preferably the sealing portion 230 at which the positive electrode lead 240 and the negative electrode lead 250 are located, which corresponds to a so-called terrace portion.

The pressing member 260 is formed in the shape in which a long hexahedral bar having a predetermined thickness and width is folded and has a multilayered structure constituted by an inner layer 261 and an outer layer 262 located outside the inner layer 261.

Here, the inner layer 261 may be disposed in tight contact with an outer surface of the sealed portion, and may be made of a resin capable of transferring heat, for example, the same material as the heat transfer pad 140. It is preferable for the outer layer 262 to be made of a metal material, such as aluminum or copper.

When the pressing member 260 having the above construction is used, the sealed portion may be maintained pressed due to the outer layer 262, which is made of a hard metal material, and therefore it is possible to inhibit reduction in adhesion performance of the inner coating layers even in a high-temperature environment.

In addition, the inner layer 261 of the pressing member 260 is made of a resin having predetermined elasticity. Even though the pressing member is disposed in tight contact with the outer surface of the sealed portion 230, therefore, it is possible to prevent damage to the cell case and to absorb thickness tolerance.

Furthermore, since the inner layer 261 of the pressing member 260 is capable of transferring heat and the lower end of the pressing member 260 is disposed in tight contact with the heat transfer pad 140 located at the bottom plate 110, it is possible to improve a heat dissipation effect of the battery cell 200.

Meanwhile, as shown in FIGS. 7 to 9, it is good for a bent portion of the pressing member 260 (a lower end in FIG. 9) to be located below. The reason for this is that it is possible to increase contact area with the heat transfer pad 140 as much as possible.

The busbar and the busbar frame will be described with reference back to FIGS. 2 to 6. The busbar 300 is configured to connect the plurality of battery cells 200 received in the module case 100 to each other in series or in parallel.

That is, the busbar 300 is a conductor having low impedance and high current capacity, and a plurality of busbars 300 is disposed side by side in the direction in which the plurality of battery cells 200 is stacked to connect the battery cells 200 to each other in series or in parallel.

In the present invention, the busbar 300 is illustrated as having a flat structure having a uniform thickness; however, the present invention is not limited thereto, and the busbar may be changed into various structures in which electrical connection is possible.

The busbar frame 400 is fixed to the module case 100 in a state of supporting the busbar 300. Specifically, the leads of the battery cell 200 extend through slits of the busbar 300, are bent, and are fixed to the busbar 300 by a known fixing means, such as laser welding or resistance welding. In order to stably support the battery cell 200 and the busbar 300, the busbar frame 400 is located between the battery cell 200 and the busbar 300.

The battery module may constitute a battery pack and may be applied to various devices.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Module case
110: Bottom plate

120: Side plate
130: Top plate
140: Heat transfer pad
200: Battery cell
210: First cell case
220: Second cell case
230: Sealed portion
240: Positive electrode lead
250: Negative electrode lead
260: Pressing member
261: Outer layer 262: Inner layer
300: Busbar
400: Busbar frame

The invention claimed is:

1. A pouch-shaped battery cell comprising:

a first cell case and a second cell case, each of which is made of a laminate sheet comprising an inner coating layer, a metal layer, and an outer coating layer, an edge of the first cell case being sealed by thermal fusion to an edge of the second cell case;

an electrode assembly received in the first cell case and the second cell case;

a positive electrode lead and a negative electrode lead each having a first side connected to the electrode assembly and a second side protruding outwards from the first cell case and the second cell case; and a pressing member wrapping a sealed portion of the edges of the first and second cell cases, wherein the pressing member comprises an inner layer and an outer layer, the inner layer disposed in tight contact with an outer surface of the sealed portion, and the outer layer extending around an outside surface of the inner layer.

2. The pouch-shaped battery cell according to claim 1, wherein the pressing member wraps the sealed portion at a location at which the positive electrode lead or the negative electrode lead extends therethrough.

3. The pouch-shaped battery cell according to claim 2, wherein the pressing member has a shape of a folded hexahedral bar.

4. The pouch-shaped battery cell according to claim 1, wherein the inner layer is made of a resin capable of transferring heat, and the outer layer is made of a metal material.

5. A battery module comprising:

a plurality of battery cells each being the pouch-shaped battery cell according to claim 1;

a module case comprising a bottom plate, a pair of side plates, and a top plate, the plurality of battery cells being received in the module case; and a plurality of busbars connecting the plurality of battery cells to each other in series or in parallel.

6. The battery module according to claim 5, further comprising a heat transfer pad disposed on an inner surface of the bottom plate.

7. The battery module according to claim 6, wherein one end of the pressing member of each of the battery cells is in tight contact with the heat transfer pad.

8. The battery module according to claim 7, wherein the bottom plate is made of a metal material.

9. A battery pack comprising the battery module according to claim 5.

* * * * *